United States Patent
Abe et al.

(10) Patent No.: US 10,573,350 B2
(45) Date of Patent: Feb. 25, 2020

(54) APPARATUS, METHOD, AND PROGRAM PRODUCT FOR TAPE POSITIONING

(71) Applicant: International Business Machines Corporation, Armonk, NY (US)

(72) Inventors: Atsushi Abe, Tokyo (JP); Tohru Hasegawa, Tokyo (JP); Eiji Ogura, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 25 days.

(21) Appl. No.: 15/423,394

(22) Filed: Feb. 2, 2017

(65) Prior Publication Data

US 2018/0217780 A1   Aug. 2, 2018

(51) Int. Cl.
*G11B 27/10* (2006.01)
*G06F 3/06* (2006.01)

(52) U.S. Cl.
CPC .......... *G11B 27/107* (2013.01); *G06F 3/0604* (2013.01); *G06F 3/0653* (2013.01); *G06F 3/0682* (2013.01); *G06F 2003/0698* (2013.01); *G06F 2212/213* (2013.01)

(58) Field of Classification Search
CPC .... G06F 3/0604; G06F 3/0682; G06F 3/0653; G06F 2003/0698; G06F 2212/213; G11B 27/107
See application file for complete search history.

(56) References Cited

U.S. PATENT DOCUMENTS

| | | | |
|---|---|---|---|
| 2007/0273998 A1* | 11/2007 | Gill | G11B 15/467 360/74.1 |
| 2007/0294461 A1* | 12/2007 | Gill | G06F 3/061 711/4 |
| 2009/0063748 A1* | 3/2009 | Bello | G06F 3/0617 711/4 |
| 2011/0149707 A1* | 6/2011 | Ozeki | G06F 3/061 369/84 |
| 2011/0176238 A1 | 7/2011 | Shiratori et al. | |
| 2012/0014014 A1* | 1/2012 | Itagaki | G11B 27/032 360/61 |
| 2012/0076622 A1* | 3/2012 | Starr | G11B 15/6835 414/273 |
| 2015/0205529 A1 | 7/2015 | Sims et al. | |
| 2017/0131949 A1* | 5/2017 | Araki | G06F 3/0659 |

FOREIGN PATENT DOCUMENTS

| | | |
|---|---|---|
| JP | 2000173243 | 6/2000 |
| JP | 2000182293 | 6/2000 |

* cited by examiner

*Primary Examiner* — Masud K Khan
(74) *Attorney, Agent, or Firm* — Kunzler Bean & Adamson

(57) ABSTRACT

An apparatus, method, system, and program product are disclosed for Tape positioning. One method includes identifying a first position on a first tape between a start of the first tape and an end of the first tape. The method includes determining that an access position of the first tape reaches the first position. The method also includes providing an indication indicating that the access position of the first tape has reached the first position.

20 Claims, 8 Drawing Sheets

APPARATUS, METHOD, AND PROGRAM PRODUCT FOR TAPE POSITIONING

FIELD

The subject matter disclosed herein relates to data storage and more particularly relates to tape positioning.

BACKGROUND

Data replication or data backups may be used to replicate data such that a backup of the data is maintained to aid in data recovery.

BRIEF SUMMARY

An apparatus for tape positioning is disclosed. A method and computer program product also perform the functions of the apparatus. In one embodiment, an apparatus includes a position identification module that identifies a first position on a first tape between a start of the first tape and an end of the first tape. The apparatus, in a further embodiment, includes a tape location determination module that determines that an access position of the first tape reaches the first position. In various embodiments, the apparatus includes a feedback module that provides an indication indicating that the access position of the first tape has reached the first position. In certain embodiments, at least a portion of the position identification module, the tape location determination module, and the feedback module includes one or more of hardware and executable code. The executable code may be stored on one or more computer readable storage media.

A method for tape positioning, in one embodiment, includes identifying a first position on a first tape between a start of the first tape and an end of the first tape. In various embodiments, the method includes determining that an access position of the first tape reaches the first position. The method may also include providing an indication indicating that the access position of the first tape has reached the first position.

In one embodiment, a computer program product for tape positioning includes a computer readable storage medium having program instructions embodied therewith. The program instructions, in some embodiments, are executable by a processor to cause the processor to identify a first position on a first tape between a start of the first tape and an end of the first tape. The program instructions, in one embodiment, are executable by a processor to cause the processor to determine that an access position of the first tape reaches the first position. In a further embodiment, the program instructions are executable by a processor to cause the processor to provide an indication indicating that the access position of the first tape has reached the first position.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
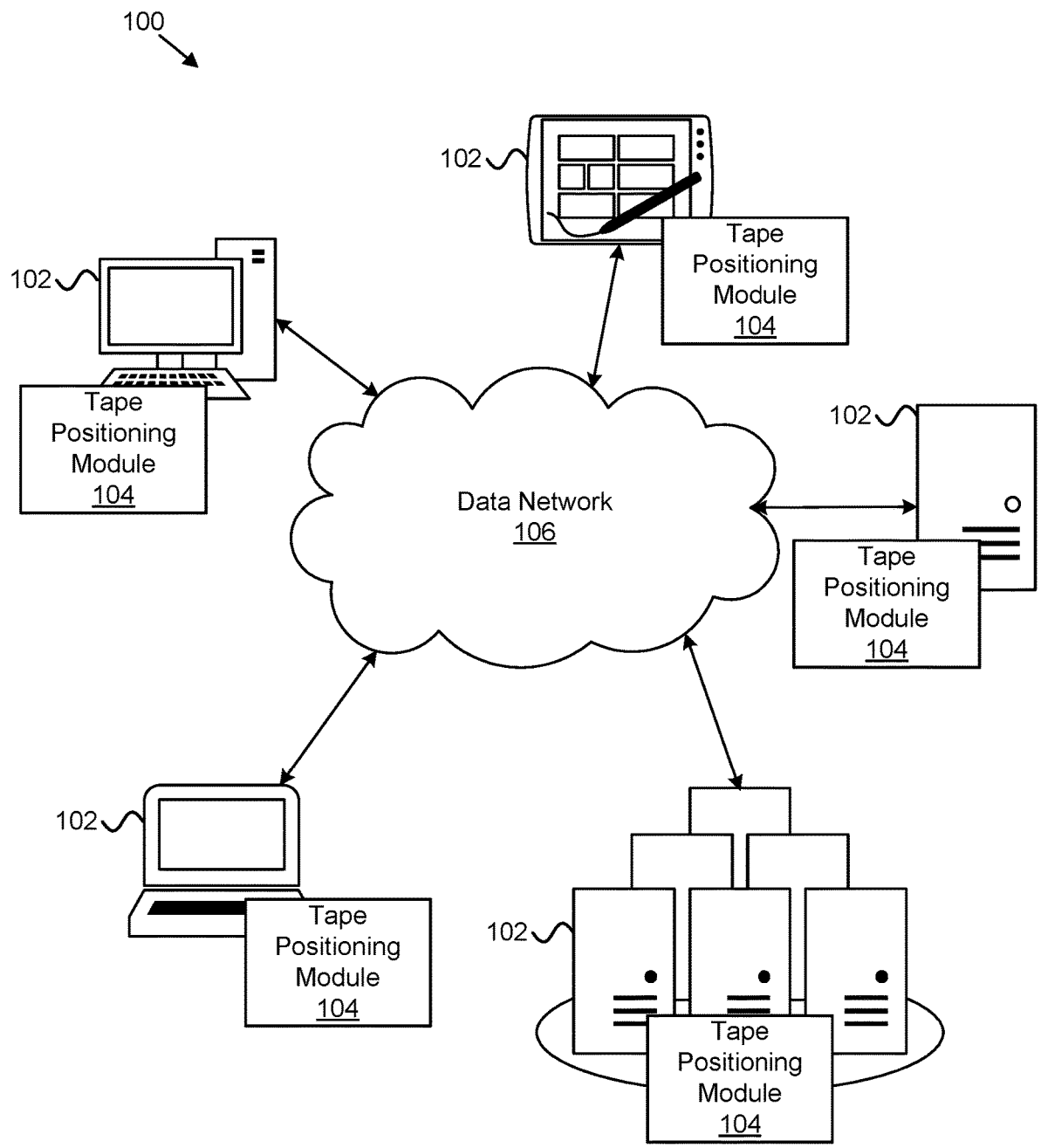
FIG. 1 is a schematic block diagram illustrating one embodiment of a system for tape positioning in accordance with one embodiment of the present invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

In certain configurations, during access to data on a tape library, a performance bottleneck may exist in an operation involving exchanging tapes. For example, in a situation in which Tape A is in a write state in a tape drive within a tape library, the write is suspended, and data on Tape B is accessed, the following operations may be performed: 1) rewind Tape A from the current access point to the beginning of the tape; 2) unload Tape A; 3) return Tape A to a slot in the tape library; 4) move Tape B from a slot in the tape library to the drive; 5) load Tape B; and 6) move Tape B to an access point for the data on Tape B.

In some configurations, the time to complete operations 2 to 5 may be a substantially constant number. However, the time to complete operations 1 and 6 may vary depending on the current position on the tape and the location of the data to be accessed.

In certain embodiments, data is recorded in a tape system by reciprocating the tape in the longitudinal direction multiple times while slightly shifting the position in the width direction. Therefore, the time for rewinding the tape from the current position to the beginning of the tape varies. The total length of the tape, which may be approximately 1,000 m in some cases, may a maximum of 90 seconds to rewind. The application using the tape drive may not know in advance the time required for rewinding the tape from the current position to the beginning of the tape. As described herein, the time for switching between tapes may be reduced.

FIG. 1 depicts one embodiment of a system 100 for tape positioning. In one embodiment, the system 100 includes information handling devices 102, tape positioning modules 104, and data networks 106. Even though a particular number of information handling devices 102, tape positioning modules 104, and data networks 106 are depicted in the system 100 of FIG. 1, one of skill in the art will recognize that any number or configuration of information handling devices 102, tape positioning modules 104, and data networks 106 may be present in the system 100.

The information handling devices 102, in certain embodiments, include computing devices, such as desktop computers, laptop computers, tablet computers, smart phones, smart televisions, or the like. The information handling devices 102 may also include servers, such as web servers, application servers, file servers, media servers, email servers, cloud servers, backup servers, virtual servers, or the like. In some embodiments, the information handling devices 102 may be part of a data center used for data storage, data backup, data replication, disaster recovery, mirroring, and/or the like. The information handling devices 102 may be located in geographically remote locations, in the same geographic location (e.g., the same data center), or some combination of both.

The information handling devices 102 may be configured to store data, backup data, replicate data, or the like. For example, the information handling devices 102 may be configured to perform synchronous or asynchronous access to stored data. In another example, information handling devices 102 may be configured as failover devices for one or more associated information handling devices 102. Moreover, the information handling devices 102 may include one or more storage volumes, storage devices, redundant array of independent disks ("RAID") devices or configurations, or the like, such as hard-disk drives, solid-state drives, flash memory devices, random-access memory ("RAM"), serial advanced technology attachment ("SATA") devices, tape devices, tape readers, or the like. In some embodiments, the information handling devices 102 are in communication via one or more data networks 106, described below.

In one embodiment, the tape positioning module 104 identifies a first position on a first tape between a start of the first tape and an end of the first tape. The tape positioning module 104 determines that an access position of the first tape reaches the first position. The tape positioning module 104 may provide an indication indicating that the access position of the first tape has reached the first position. In this manner, the tape positioning module 104 may facilitate efficient access to tapes. Ultimately, this may facilitate providing faster access for applications to store files on a tape cartridge and/or reduced resource usage (e.g., time, processor, memory, data bandwidth, etc.).

As may be appreciated, the tape positioning module 104 may be used in any suitable data replication system 100. In certain embodiments, as described below with reference to FIGS. 2 and 3, the tape positioning module 104 includes multiple modules that perform the operations of the tape positioning module 104.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN"), an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, RAM, or the like.

Figure 2:
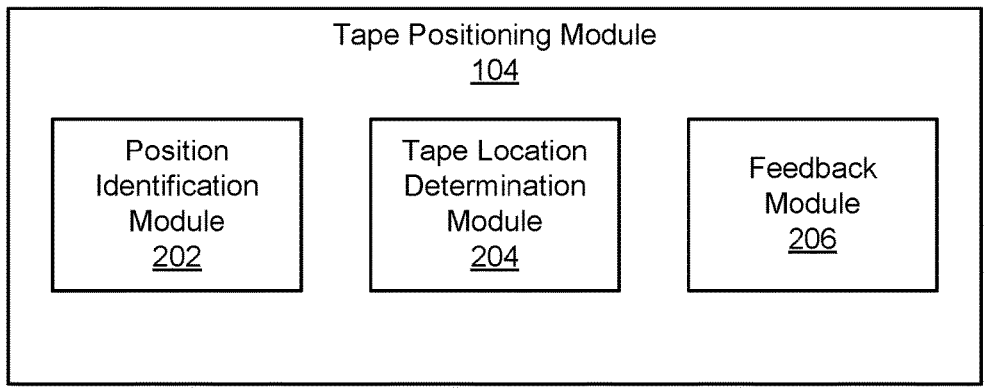
FIG. 2 is a schematic block diagram illustrating one embodiment of a module for tape positioning in accordance with one embodiment of the present invention.

FIG. 2 is a schematic block diagram illustrating one embodiment of a module 200 for tape positioning. In one embodiment, the module 200 includes an embodiment of a tape positioning module 104. The tape positioning module 104, in various embodiments, includes one or more of a position identification module 202, a tape location determination module 204, and a feedback module 206, which are described in more detail below.

Figure 9:
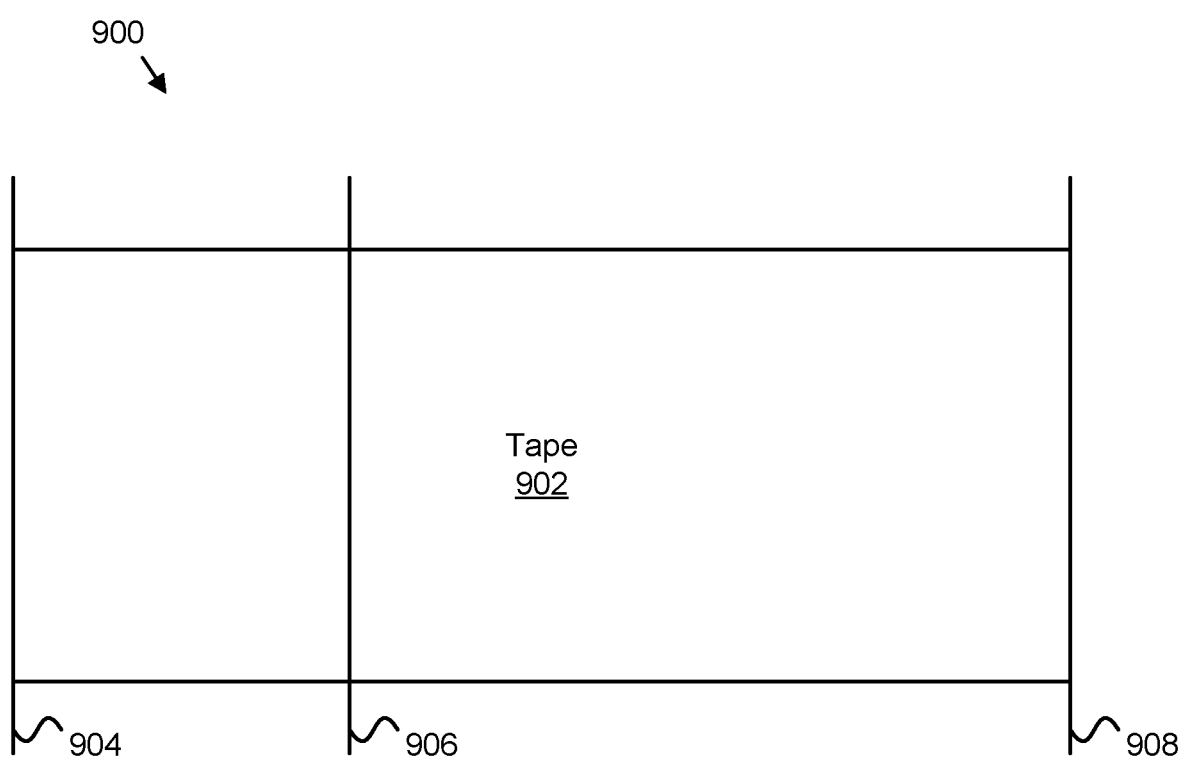
FIG. 9 is a block diagram of one embodiment of a tape in accordance with one embodiment of the present invention.

In one embodiment, the position identification module 202 identifies a first position on a first tape between a start of the first tape and an end of the first tape. In some embodiments, the first position may be any suitable position between the start of the first tape and the end of the first tape. For example, the first position may be $3/4$, $1/2$, $1/3$, $1/4$, $1/8$, $1/10$, or $1/20$ of the way from the start of the first tape toward the end of the first tape. The first position may not be the start of the first tape (e.g., completely rewound, stop position after rewinding the whole tape, etc.) or the end of the first tape (e.g., an opposite position from the start of the first tape). The first position may be used as a stopping position so that the first tape does not have to be rewound completely each time before transitioning to a new tape. Turning to FIG. 9, one embodiment of a tape 900 is illustrated. The tape 900 illustrates a start 904 of the tape 900, a predetermined position 906 of the tape 900 (e.g., first position), and an end 908 of the tape 900.

Returning to FIG. 2, the position identification module 202 may identify the position based on a length of tape, a time from the start of the tape, an indication on the tape, and so forth. In some embodiments, the position identification module 202 may store data on the first tape to indicate a location of the first position. The data may be positioned at the location of the first position, or at another position, such as an index.

The tape location determination module 204, in one embodiment, determines that an access position of the first tape reaches the first position. The access position may be any suitable position of the first tape extending from the start of the first tape to the end of the first tape at which an access (e.g., read and/or write) occurs. The access position may reach the first position by accessing the tape in a first direction (e.g., forward direction) from the start of the first tape toward the end of the first tape and/or by accessing the tape in a second direction (e.g., reverse direction) from the end of the first tape toward the start of the first tape. The tape location determination module 204 may determine that the access position reaches the first position based on an identifier that identifies a location of the first position on the first tape. The identifier may be data stored on the first tape, a stored tape position external from the first tape (e.g., a length of tape from the start of the tape, a time from the start of the tape, etc.), and so forth.

The feedback module 206, in one embodiment, provides an indication indicating that the access position of the first tape has reached the first position. In some embodiments, the feedback module 206 provides an indication that indicates that the access position of the first tape has passed the first position. The indication may be an error code, a return code, a signal, and/or any suitable response.

In certain embodiments, at least a portion of the position identification module 202, the tape location determination module 204, and the feedback module 206 include one or more of hardware and executable code. In such embodiments, the executable code may be stored on one or more computer readable storage media.

Figure 3:
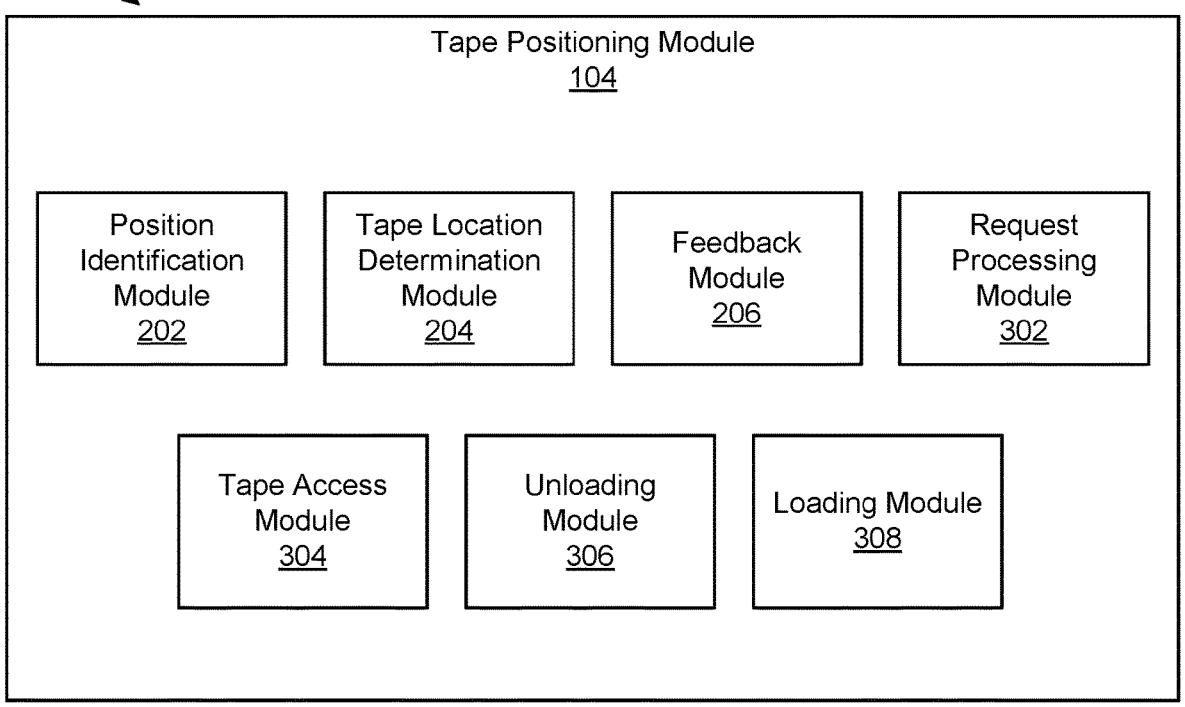
FIG. 3 is a schematic block diagram illustrating one embodiment of another module for tape positioning in accordance with one embodiment of the present invention.

FIG. 3 is a schematic block diagram illustrating one embodiment of another module 300 for tape positioning. In one embodiment, the module 300 includes an embodiment of a tape positioning module 104. The tape positioning module 104, in various embodiments, includes one or more of a position identification module 202, a tape location determination module 204, and a feedback module 206, which may be substantially similar to the position identification module 202, the tape location determination module 204, and the feedback module 206 described above. The tape positioning module 104 may also include one or more of a request processing module 302, a tape access module 304, an unloading module 306, and a loading module 308, which are described in more detail below.

In one embodiment, the request processing module 302 receives requests for access to tapes. The request processing module 302 may determine an order that requests are received and/or an order for servicing the requests that are received. The request processing module 302 may determine which request to service at a particular time based at least in part on an order that the requests are received and indications indicating that an access position of a tape has reached a predetermined position (e.g., the first position).

The tape access module 304, in certain embodiments, accesses a tape in response to receiving a request for access to the tape. In some embodiments, the tape access module 304 may access a tape as directed by the request processing module 304. In some embodiments, the unloading module 306 may control unloading tapes. In various embodiments, the loading module 308 may control loading tapes.

In one example, the request processing module 302 may receive a first request for access to a first tape. The tape access module 304 may access the first tape in response to receiving the first request for access to the first tape. Moreover, the request processing module 302 may receive a second request for access to a second tape after receiving the first request, and the tape access module 304 may access the second tape in response to receiving the second request and in response to the indication. The unloading module 306 may unload the first tape while the first tape is at approximately the first position and the loading module 308 may load the second tape.

In certain embodiments, the request processing module 302 may facilitate completing the first request before directing the tape access module 304 to access the second tape. In some embodiments, the request processing module 302 may receive a third request for access to the first tape after receiving the second request. Moreover, the request processing module 302 may direct the tape access module 304 to access the first tape in response to receiving the third request until the access position of the first tape reaches the first position. In some embodiments, the request processing module 302 may receive a fourth request for access to the second tape after receiving the third request. The request processing module 302 may direct the tape access module 304 to access the second tape in response to receiving the fourth request until the access position of the second tape reaches a second position of the second tape. The second position of the second tape may be between a start of the second tape and an end of the second tape.

Figure 4:
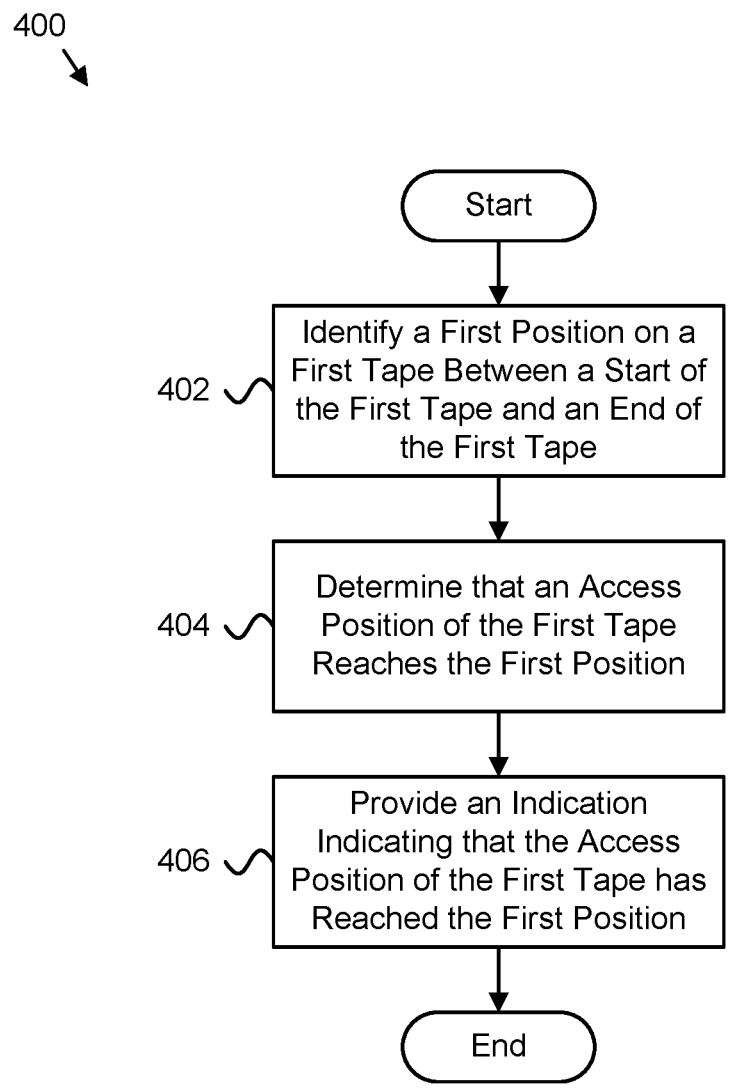
FIG. 4 is a schematic flow chart diagram illustrating one embodiment of a method for tape positioning in accordance with one embodiment of the present invention.

FIG. 4 is a schematic flow chart diagram illustrating one embodiment of a method 400 for tape positioning. In one embodiment, the method 400 begins and identifies 402 a first position on a first tape between a start of the first tape and an end of the first tape. In some embodiments, the first tape is part of an HSM system. The method 400 determines 404 that an access position of the first tape reaches the first position. The method 400 also provides 406 an indication indicating that the access position of the first tape has reached the first position, and the method 400 ends. In some embodiments, providing 406 the indication indicates that the access position of the first tape has passed the first position.

Figure 5:
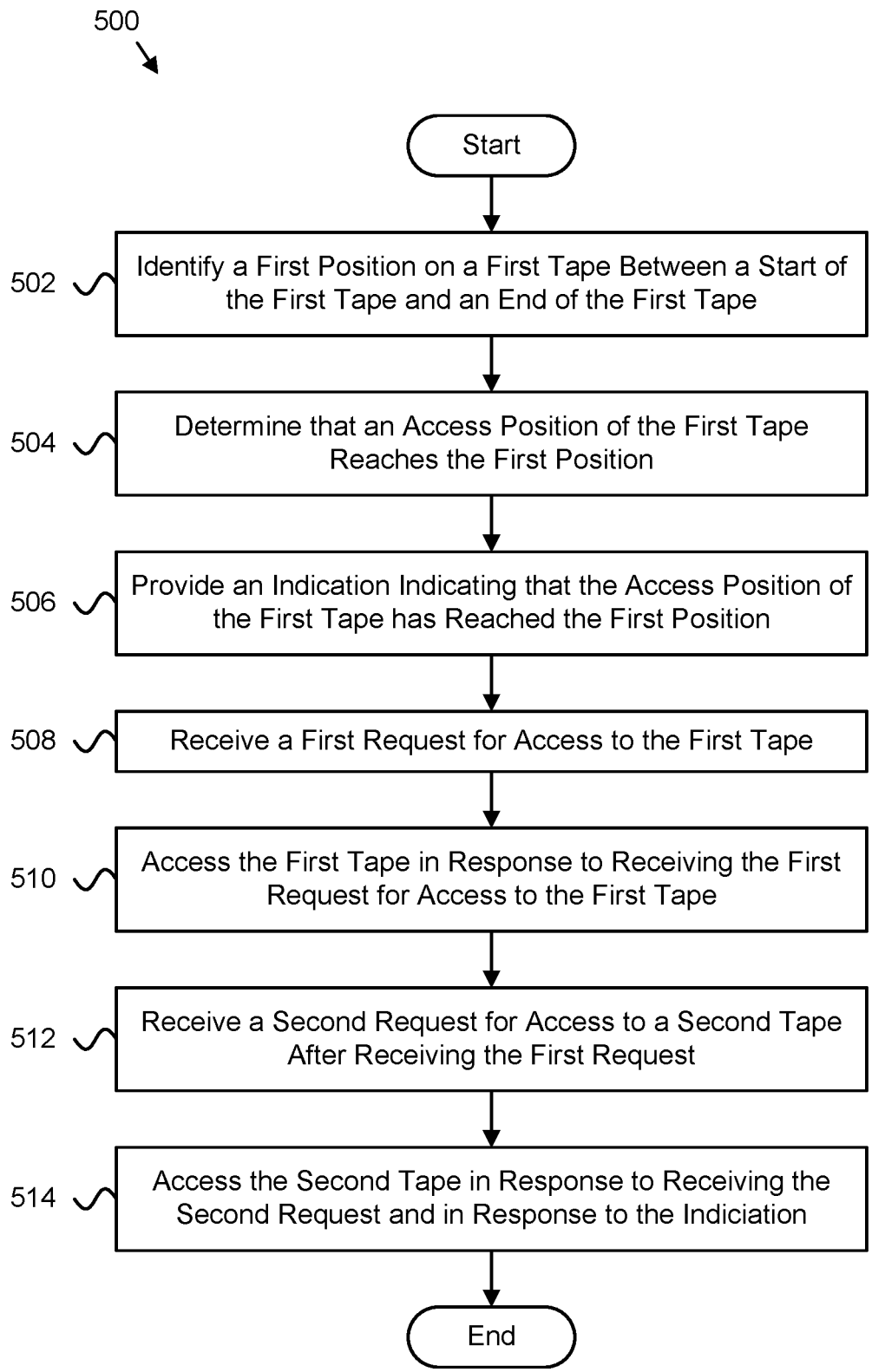
FIG. 5 is a schematic flow chart diagram illustrating another embodiment of a method for tape positioning in accordance with one embodiment of the present invention.

FIG. 5 is a schematic flow chart diagram illustrating another embodiment of a method 500 for tape positioning. In one embodiment, the method 500 begins and identifies 502 a first position on a first tape between a start of the first tape and an end of the first tape. In some embodiments, the first tape is part of an HSM system. The method 500 determines 504 that an access position of the first tape reaches the first position. The method 500 also provides 506 an indication indicating that the access position of the first tape has reached the first position. In some embodiments, providing 506 the indication indicates that the access position of the first tape has passed the first position.

The method 500 receives 508 a first request for access to the first tape. The method 500 accesses 510 the first tape in response to receiving the first request for access to the first tape. The method 500 receives 512 a second request for access to a second tape after receiving the first request. The method 500 accesses 514 the second tape in response to receiving the second request and in response to the indication, and the method 500 ends.

Figure 6:
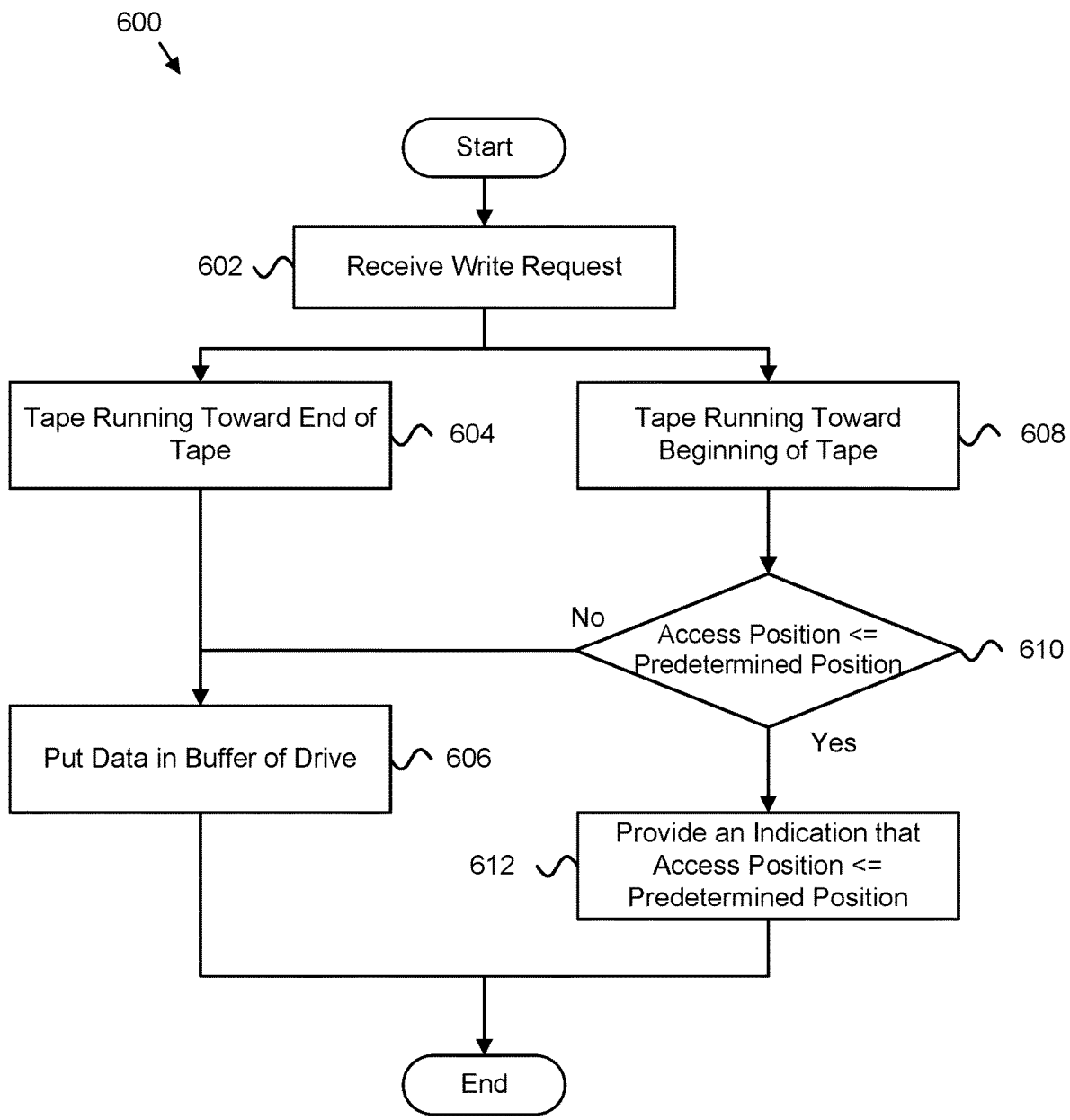
FIG. 6 is a schematic flow chart diagram illustrating a further embodiment of a method for tape positioning in accordance with one embodiment of the present invention.

FIG. 6 is a schematic flow chart diagram illustrating a further embodiment of a method 600 for tape positioning. The method 600 starts and receives 602 a write request. If the tape is running 604 toward the end of the tape, the method 600 puts 606 the data from the write request into a buffer of the drive, and the method 600 ends. If the tape is running 608 toward the beginning of the tape, the method 600 determines 610 whether the access position is less than or equal to a predetermined position. As may be appreciated, the access position less than or equal to the predetermined position may mean that the access position is between the beginning of the tape and the predetermined position (i.e., less than the predetermined position), or that the access position is at the predetermined position.

If the method 600 determines 610 that the access position is not less than or equal to the predetermined position, the method 600 puts 606 the data from the write request into a buffer of the drive, and the method 600 ends. If the method 600 determines 610 that the access position is less than or equal to the predetermined position, the method 600 provides 612 an indication that the access position is less than or equal to the predetermined position, and the method 600 ends.

In one example, large files may be written on two tapes in a configuration including a single tape drive and multiple cartridges. In such an example, the following requests may be received: 1) open request for File A on Tape X; 2) open request for File B on Tape Y; 3) append request for File A (offset=0, size=128 K); 4) append request for File B (offset=0, size=128 K); 5) append request for File A (offset=128 K, size=128 K); 6) append request for File B (offset=128 K, size=128 K); 7) close request for File A; and close request for File B.

In certain configurations, an exchange of Tape X and Tape Y is performed without considering the current position on the tape before exchanging, and therefore, the replacement of the tape occurs for each append request.

On the other hand, as described in various embodiments herein, the processing of the append request for File B (offset=0, size=128 K) and any subsequent write requests for File B is postponed, and the append request for File A is prioritized. Thereafter, data may be written close to the beginning of Tape X. When the signal indicating the arrival at the predetermined position is received, this triggers the replacement of the tape. In turn, the processing of the append request for File A is postponed, and the append request for File B is prioritized. By repeating such operations, the tape is necessarily replaced near the beginning of the tape, allowing for the shortening of the time required for the exchange of the tape. Further, if File A is closed in the middle of the tape, the tape is replaced at that time, and the processing of the write request for File B that is postponed is performed.

Figure 7:
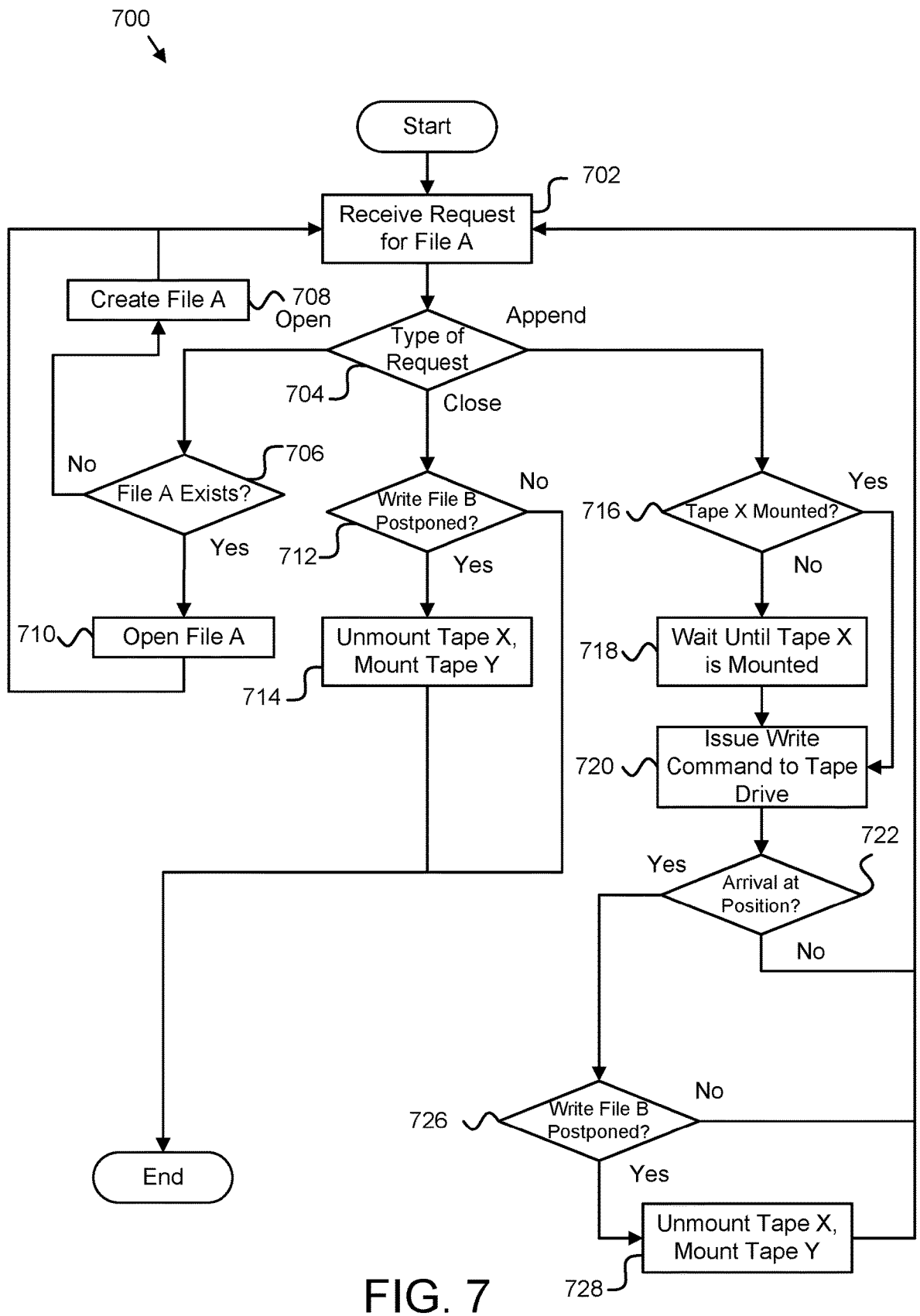
FIG. 7 is a schematic flow chart diagram illustrating yet another embodiment of a method for tape positioning in accordance with one embodiment of the present invention.

FIG. 7 is a schematic flow chart diagram illustrating yet another embodiment of a method 700 for tape positioning. The method 700 starts and receives 702 a request for File A on Tape X. The method 700 then determines 704 the type of request received. If the method 700 determines 704 that the type of request is an "Open" request, the method 700 determines 706 whether File A exists. If the method 700 determines 706 that File A does not exist, the method 700 creates 708 File A. If the method 700 determines 706 that File A does exist, the method 700 opens 710 File A.

If the method 700 determines 704 that the type of request is a "Close" request, the method 700 determines 712 whether a write for File B on Tape Y is postponed. If the method 700 determines 712 that the write for File B is not postponed, the method 700 ends. If the method 700 determines 712 that the write for File B is postponed, the method 700 unmounts 714 Tape X and mounts Tape Y.

If the method 700 determines 704 that the type of request is an "Append" request, the method 700 determines 716 whether Tape X is mounted. If the method 700 determines 716 that Tape X is not mounted, the method 700 waits 718 until Tape X is mounted, then the method 700 issues 720 the write command to the tape drive. If the method 700 determines 716 that Tape X is mounted, the method 700 issues 720 the write command to the tape drive.

The method 700 determines 722 whether Tape X has arrived at a predetermined position. If the method 700 determines 722 that the Tape X has not arrived at the predetermined position, the method 700 returns to receive 702 a request for File A. If the method 700 determines 722 that the Tape X has arrived at the predetermined position, the method 700 determines 726 whether a write for File B is postponed (e.g., a write for File B that was received prior to the current write to File A). If the method 700 determines 726 that a write for File B is not postponed, the method 700 may finish issuing the write command to the tape drive and return to receiving 702 a request for File A. If the method 700 determines 726 that a write for File B is postponed, the method 700 unmounts 728 Tape X and mounts Tape Y, then the method 700 returns to receiving 702 a request for File A.

Figure 8:
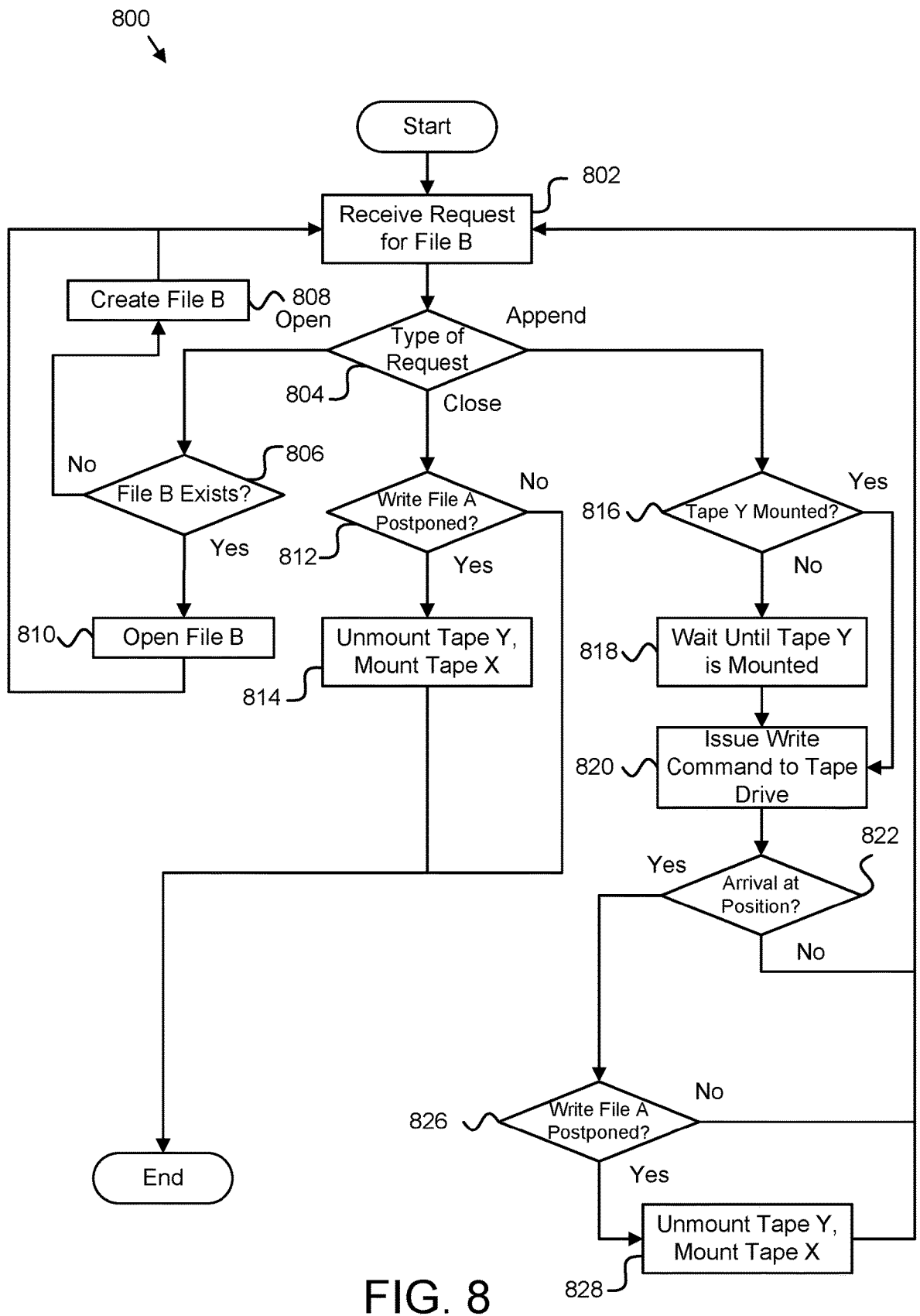
FIG. 8 is a schematic flow chart diagram illustrating an additional embodiment of a method for tape positioning in accordance with one embodiment of the present invention.

FIG. 8 is a schematic flow chart diagram illustrating an additional embodiment of a method 800 for tape positioning. The method 800 starts and receives 802 a request for File B on Tape Y. The method 800 then determines 804 the type of request received. If the method 800 determines 804 that the type of request is an "Open" request, the method 800 determines 806 whether File B exists. If the method 800 determines 806 that File B does not exist, the method 800 creates 808 File B. If the method 800 determines 806 that File B does exist, the method 800 opens 810 File B.

If the method 800 determines 804 that the type of request is a "Close" request, the method 800 determines 812 whether a write for File A on Tape X is postponed. If the method 800 determines 812 that the write for File A is not postponed, the method 800 ends. If the method 800 determines 812 that the write for File A is postponed, the method 800 unmounts 814 Tape Y and mounts Tape X.

If the method 800 determines 804 that the type of request is an "Append" request, the method 800 determines 816 whether Tape Y is mounted. If the method 800 determines 816 that Tape Y is not mounted, the method 800 waits 818 until Tape Y is mounted, then the method 800 issues 820 the write command to the tape drive. If the method 800 determines 816 that Tape Y is mounted, the method 800 issues 820 the write command to the tape drive.

The method 800 determines 822 whether Tape Y has arrived at a predetermined position. If the method 800 determines 822 that the Tape Y has not arrived at the predetermined position, the method 800 returns to receive 802 a request for File B. If the method 800 determines 822 that the Tape Y has arrived at the predetermined position, the method 800 determines 826 whether a write for File A is postponed (e.g., a write for File A that was received prior to the current write to File B). If the method 800 determines 826 that a write for File A is not postponed, the method 800 may finish issuing the write command to the tape drive and return to receiving 802 a request for File B. If the method 800 determines 826 that a write for File A is postponed, the method 800 unmounts 828 Tape Y and mounts Tape X, then the method 800 returns to receiving 802 a request for File B.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a request processing module that receives a first request for access to a first tape;
   a tape access module that accesses the first tape in response to receiving the first request for access to the first tape;
   a position identification module that identifies a first position on the first tape between a start of the first tape and an end of the first tape in response to the tape access module accessing the first tape;
   a tape location determination module that determines that an access position of the first tape reaches the first position;
   a feedback module that provides an indication indicating that the access position of the first tape has reached the first position, wherein the request processing module receives a second request for access to a second tape after receiving the first request;
   an unloading module that unloads the first tape while the first tape is at approximately the first position in response to receiving the second request and in response to the indication, wherein the first position is between the start of the first tape and the end of the first tape, the first position is at a position after at least a portion of at least one file is written and before the end of the first tape, and the first position is not obtained by rewinding; and
   a loading module that loads the second tape in response to the unloading module unloading the first tape, and the tape access module accesses the second tape in response to receiving the second request and in response to the indication;
   wherein at least a portion of the position identification module, the tape location determination module, and the feedback module comprises one or more of hardware and executable code, the executable code being stored on one or more computer readable storage media.

2. The apparatus of claim 1, wherein accessing the second tape comprises completing the first request before accessing the second tape.

3. The apparatus of claim 1, wherein the request processing module receives a third request for access to the first tape after receiving the second request.

4. The apparatus of claim 3, wherein the tape access module accesses the first tape in response to receiving the third request until the access position of the first tape reaches the first position.

5. The apparatus of claim 4, wherein the request processing module receives a fourth request for access to the second tape after receiving the third request.

6. The apparatus of claim 5, wherein the tape access module accesses the second tape in response to receiving the fourth request after accessing the second tape in response to receiving the second request until the access position of the second tape reaches a second position of the second tape, wherein the second position of the second tape is between a start of the second tape and an end of the second tape.

7. The apparatus of claim 1, wherein the feedback module providing the indication indicates that the access position of the first tape has passed the first position.

8. A method for tape positioning, comprising:
   receiving a first request for access to a first tape;
   accessing the first tape in response to receiving the first request for access to the first tape;
   identifying a first position on the first tape between a start of the first tape and an end of the first tape in response to the tape access module accessing the first tape;
   determining that an access position of the first tape reaches the first position;
   providing an indication indicating that the access position of the first tape has reached the first position;
   receiving a second request for access to a second tape after receiving the first request;
   unloading the first tape while the first tape is at approximately the first position in response to receiving the second request and in response to the indication, wherein the first position is between the start of the first tape and the end of the first tape, the first position is at a position after at least a portion of at least one file is written and before the end of the first tape, and the first position is not obtained by rewinding;
   loading the second tape in response to the unloading module unloading the first tape; and
   accessing the second tape in response to receiving the second request and in response to the indication.

9. The method of claim 8, wherein accessing the second tape comprises completing the first request before accessing the second tape.

10. The method of claim 8, further comprising receiving a third request for access to the first tape after receiving the second request.

11. The method of claim 10, further comprising accessing the first tape in response to receiving the third request until the access position of the first tape reaches the first position.

12. The method of claim 11, further comprising receiving a fourth request for access to the second tape after receiving the third request.

13. The method of claim 12, further comprising accessing the second tape in response to receiving the fourth request after accessing the second tape in response to receiving the second request until the access position of the second tape reaches a second position of the second tape, wherein the second position of the second tape is between a start of the second tape and an end of the second tape.

14. The method of claim 8, wherein providing the indication indicates that the access position of the first tape has passed the first position.

15. A computer program product for tape positioning, the computer program product comprising a computer readable storage medium having program instructions embodied therewith, the program instructions executable by a processor to cause the processor to:
receive a first request for access to a first tape;
access the first tape in response to receiving the first request for access to the first tape;
identify a first position on the first tape between a start of the first tape and an end of the first tape in response to the tape access module accessing the first tape;
determine that an access position of the first tape reaches the first position;
provide an indication indicating that the access position of the first tape has reached the first position;
receive a second request for access to a second tape after receiving the first request;
unload the first tape while the first tape is at approximately the first position in response to receiving the second request and in response to the indication, wherein the first position is between the start of the first tape and the end of the first tape, the first position is at a position after at least a portion of at least one file is written and before the end of the first tape, and the first position is not obtained by rewinding;
load the second tape in response to the unloading module unloading the first tape; and
access the second tape in response to receiving the second request and in response to the indication.

16. The computer program product of claim 15, wherein accessing the second tape comprises completing the first request before accessing the second tape.

17. The computer program product of claim 15, wherein the program instructions executable by the processor cause the processor to receive a third request for access to the first tape after receiving the second request.

18. The computer program product of claim 17, wherein the program instructions executable by the processor cause the processor to access the first tape in response to receiving the third request until the access position of the first tape reaches the first position.

19. The computer program product of claim 18, wherein the program instructions executable by the processor cause the processor to receive a fourth request for access to the second tape after receiving the third request.

20. The computer program product of claim 19, wherein the program instructions executable by the processor cause the processor to access the second tape in response to receiving the fourth request after accessing the second tape in response to receiving the second request until the access position of the second tape reaches a second position of the second tape, wherein the second position of the second tape is between a start of the second tape and an end of the second tape.

* * * * *